Patented Dec. 17, 1940

2,225,543

UNITED STATES PATENT OFFICE 2,225,543

MANUFACTURE OF ETHYL BENZENE

James L. Amos, Midland, Mich., assignor to The Dow Chemical Company, Midland, Mich., a corporation of Michigan No Drawing. Application May 16, 1938
Serial No. 208,221

11 Claims. (Cl. 260—671)

The present invention concerns an improved process for preparing ethyl benzene. More particularly it comprises reacting ethylene with benzene according to the Friedel-Crafts procedure in the presence of at least a catalytic amount of an isopropylated benzene.

The commercial manufacture of ethyl benzene is for the most part carried out by reacting ethylene with benzene in the presence of a metal halide complex catalyst of the Friedel-Crafts type. This method has the disadvantages that even under optimum conditions the yield of ethyl benzene based on the ethylene employed rarely if ever exceeds about 50 per cent of the theoretical and that the proportion of polyethyl benzenes formed is undesirably large.

I have now discovered that isopropylated benzene compounds exert a catalytic or "promoting" effect on the reaction of ethylene with benzene in the presence of a Friedel-Crafts catalyst and markedly increase the ease and efficiency of such ethylation. I have also found that when an isopropylated benzene is employed as a catalyst in such reaction the yield of ethyl benzene is increased by about 20 to 30 per cent and the formation of polyethyl benzenes is reduced. The invention, then, consists in the improved method of making ethyl benzene which comprises reacting ethylene with benzene according to the Friedel-Crafts procedure in the presence of at least a catalytic amount of an isopropylated benzene, as hereinafter explained.

The mechanism of the catalytic action of isopropyl benzenes in the ethylation of benzene is not clearly understood. However, experimental evidence seems to indicate that the ethylene reacts first with the isopropyl benzene to form an ethylated isopropyl benzene and that this latter compound then undergoes rearrangement with benzene, forming the desired ethyl benzene and regenerating the isopropyl benzene. Thus:

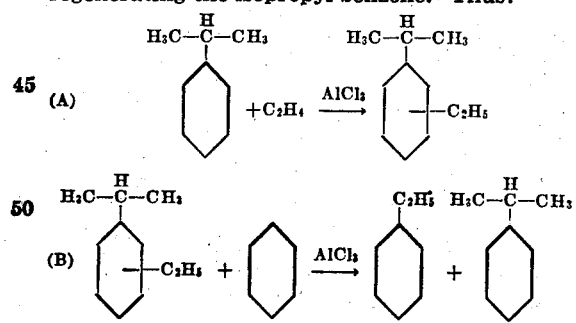

Apparently the sequence reactions A and B proceed more rapidly and with greater efficiency than the direct condensation of ethylene with benzene and also result in the formation of a lower proportion of polyethyl benzenes.

In preparing ethyl benzene by the method of the present invention, ethylene is condensed with benzene in the presence of a metal halide catalyst according to the usual Friedel-Crafts reaction procedure, the isopropylated benzene catalyst being added to the reaction mixture either prior to or during ethylation. The proportion of isopropylated benzene is not critical, but I prefer between about 2 and about 20 parts by weight of the compound per 100 parts of benzene initially employed. When less than about 2 parts of isopropylated benzene are used the beneficial effect of the catalyst is less pronounced, and when more than about 20 parts are employed side reactions may take place to an undesirable extent. It is to be understood that not only mono-isopropyl benzene but also poly-isopropyl benzenes are catalysts within the scope of the present invention.

In practice the isopropyl benzene catalyst need not be added as such to the benzene-metal halide reaction mixture, but may be formed in situ by passing propylene or an isopropyl halide into the reaction mixture in a quantity sufficient to produce therein the desired proportion of isopropylated benzene. This formation of catalyst may be accomplished either before or during ethylation; that is, the propylene may be introduced into the reaction mixture prior to or simultaneously with the addition of ethylene. It will be appreciated, then, that my invention not only includes reacting ethylene with benzene according to the Friedel-Crafts procedure in the presence of an isopropylated benzene added to or formed as such in the reaction mixture prior to ethylation, but also encompasses preparing ethyl benzene by reacting benzene with a gaseous mixture comprising ethylene and a smaller proportion of propylene.

When operating in accordance with this latter embodiment of the invention the proportion of propylene in the gaseous mixture should be such as to produce in the reaction mixture a quantity of isopropyl benzene catalyst falling within the approximate limits hereinbefore mentioned, i. e. about 2 to 20 parts of isopropylated benzene per 100 parts of benzene initially employed. To this end I prefer to use a gaseous mixture containing between about 5 and about 75 parts by weight of propylene per 100 parts of ethylene, although other proportions may sometimes be employed. This gaseous mixture may be formed by mixing the pure gases or may be obtained from any other suitable source such as the "cracked gas" derived from the pyrolysis of petroleum hydrocarbons, and may contain a considerable proportion of inert gases without detrimental effect. When employing "cracked gas" or similar mixtures it is essential that the higher olefines, e. g. butylene, amylene, etc., present in such gas first be substantially removed by suitable treatment, since the presence of an appreciable proportion, e. g. more than about 0.5–1.0 per cent, of such materials practically nullifies the beneficial action of the propylene.

When the isopropylated benzene catalyst is present in the benzene-metal halide reaction mixture prior to the introduction of ethylene, the ethylation may be carried out at any desired temperature at which the formation of ethyl benzene proceeds satisfactorily. However, when a gaseous mixture comprising ethylene and propylene is reacted in accordance wtih the invention, it is desirable that the temperature be in excess of about 55° C. and preferably in the range 60° to 80° C. At temperatures much below 55° C. the formation of ethyl benzene is somewhat retarded and by-product formation may occur to an undesirable degree, while at temperatures above about 80° C. an appreciable proportion of the benzene may be lost by volatilization unless unusual precautions are taken.

The following examples illustrate the improved results obtainable when preparing ethyl benzene by the process of the present invention, but are not to be construed as limiting its scope. Example 1 describes the ethylation of benzene by usual prior art procedure and is presented for sake of comparison with the remaining examples which are in accordance with the invention.

Example 1

A mixture of 1310 grams of benzene and 50 grams of aluminum chloride was charged into a reactor equipped with a reflux condenser and heated to a temperature of about 50° C. Ethylene was then introduced with agitation at the rate of 33.8 grams per hour for 4.75 hours, during which time the reaction temperature gradually rose to about 75° C. The small quantity of vent gases escaping from the reactor was collected during the entire run and was found to contain less than 0.7 gram of ethylene. The crude reaction product was cooled, washed with a dilute aqueous alkali, dried over calcium chloride, and subjected to repeated careful fractional distillation to separate the products of reaction. The yields of ethylated benzenes based upon the ethylene employed were as follows: mono-ethyl benzene, 47.5 per cent of theoretical; di-ethyl benzene, 10.0 per cent.

In a series of reactions carried out as just described, the average yield of ethyl benzene was 48.3 per cent of theoretical.

Example 2

Ethylene was introduced into a mixture of 1313 grams of benzene, 50 grams of aluminum chloride and 75 grams of mono-isopropyl benzene at the rate of 33.8 grams per hour for 4.75 hours under the same conditions as in Example 1. The vent gases contained 2.1 grams of ethylene. The crude reaction product was washed, dried, and fractionally distilled as in Example 1. The yields of ethylated benzenes were: mono-ethyl benzene, 64.3 per cent; diethyl benzene, 4.9 per cent. The mono-isopropyl benzene catalyst was recovered unchanged.

Example 3

A mixture of 1325 grams of benzene and 50 grams of aluminum chloride was charged into a reactor equipped with a reflux condenser and heated to a temperature of about 50° C. Propylene was then introduced with agitation at the rate of 15.9 grams per hour for 4.75 hours. Addition of propylene was then discontinued and ethylene was introduced at the rate of 33.8 grams per hour for 4.75 hours. During the process the temperature rose gradually to about 80° C. The vent gases escaping from the reactor during the entire run were collected and found to contain 0.5 gram of ethylene and 0.8 gram of propylene. The crude reaction product was cooled, washed with dilute aqueous alkali, dried over calcium chloride, and subjected to repeated careful fractional distillation. The yields of ethylated benzenes were: monoethyl benzene, 62.2 per cent; diethyl benzene, 4.2 per cent.

Example 4

A mixture of 1310 grams of benzene and 50 grams of aluminum chloride was reacted with a gaseous mixture containing 59.7 per cent by weight of ethylene and 41.3 per cent of propylene, said mixture being added at the rate of 56.5 grams per hour for 4.75 hours under the same conditions as in the preceding examples. The vent gas contained 0.2 gram of ethylene and no measurable quantity of propylene. The crude reaction product was washed, dried, and fractionally distilled as in Example 1. The yields of ethylated benzenes were: mono-ethyl benzene, 61.5 per cent; diethyl benzene, 7.7 per cent.

From the foregoing examples it is evident that the presence of an isopropylated benzene in the benzene-metal halide reaction mixture during ethylation increases the yield of ethyl benzene from about 48 per cent of theoretical to about 62–64 per cent, representing an increase in ethylene economy of about 30 per cent. It will be understood that the isopropylated benzene catalyst may be introduced into the reaction mixture in other ways than those hereinbefore described. For instance any suitable aromatic compound containing an isopropyl radical, e. g. isopropyl ethyl benzene, isopropyl chlorobenzene, etc., which is capable of undergoing intermolecular rearrangement with benzene to form isopropyl benzene may be added.

The term "an isopropylated benzene" as employed herein refers both to mono-isopropyl benzene and to polyisopropyl benzenes.

Other modes of applying the principle of the invention may be employed instead of those explained, change being made as regards the details hereinbefore set forth, provided the step or steps recited by any of the following claims or the equivalent of such stated step or steps be employed.

I therefore particularly point out and distinctly claim as my invention:

1. The process of preparing ethyl benzene which comprises reacting a gas essentially comprising ethylene and containing not more than 1.0 per cent of butylene and higher olefins with benzene in the presence of a metal halide catalyst of the Friedel-Crafts type, and in the presence of at least a catalytic proportion of an isopropylated benzene compound, said process being carried out at a temperature and pressure at which ethylene has a substantial rate of reaction with benzene.

2. The method of preparing ethyl benzene which comprises reacting a gas essentially comprising ethylene and containing less than 1.0 per cent of butylenes and higher olefines with benzene in the presence of a metal halide catalyst of the Friedel-Crafts type and in the presence of at least a catalytic proportion of an isopropylated benzene, and at a temperature above about 55° C.

3. The method of preparing ethyl benzene which comprises reacting a gas essentially comprising ethylene, the concentration of butylenes and higher olefines in said gas being less than 1.0 per cent, with benzene in the presence of a metal halide catalyst of the Friedel-Crafts type and in the presence of an isopropylated benzene in the proportion of between about 2 and about 20 parts by weight of said compound per 100 parts of benzene initially employed, and at a temperature above about 55° C.

4. The method of preparing ethyl benzene which comprises reacting a gas essentially comprising ethylene and containing less than 1.0 per cent of butylenes and higher olefines with benzene in the presence of an aluminum chloride catalyst of the Friedel-Crafts type and in the presence of at least a catalytic proportion of an isopropylated benzene, and at a temperature above about 55° C.

5. In a method of preparing ethyl benzene by reacting a gas essentially comprising ethylene, the concentration of butylenes and higher olefines in said gas being less than 1.0 per cent, with benzene in the presence of a metal halide catalyst of the Friedel-Crafts type, the improvement which comprises conducting the reaction in the presence of at least a catalytic proportion of an isopropylated benzene, and at a temperature above about 55° C.

6. In a method of preparing ethyl benzene by reacting a gas essentially comprising ethylene, the concentration of butylenes and higher olefines in said gas being less than 1.0 per cent, with benzene in the presence of a metal halide catalyst of the Friedel-Crafts type, the improvement which comprises conducting the reaction in the presence of an isopropylated benzene in the proportion of between about 2 and about 20 parts by weight of isopropyl benzene per 100 parts of benzene, and at a temperature between about 55° C. and about 80° C.

7. The method of preparing ethyl benzene which comprises reacting a gaseous mixture, the olefinic constituents of which consist substantially only of ethylene and propylene and contain less than 1.0 per cent of butylene and higher olefins, with benzene in the presence of a metal halide catalyst of the Friedel-Crafts type at a temperature above about 55° C.

8. The method of preparing ethyl benzene which comprises reacting a gaseous mixture the olefine constituents of which consist substantially only of ethylene and propylene, the concentration of butylenes and higher olefines in said gas being less than 1.0 per cent, with benzene in the presence of an aluminum chloride catalyst of the Friedel-Crafts type and at a temperature between about 55° C. and about 80° C.

9. In a method of preparing ethyl benzene by reacting ethylene with benzene in the presence of a metal halide catalyst of the Friedel-Crafts type, the step which comprises introducing a gaseous mixture the olefinic constituents of which consist substantially only of ethylene and propylene in the proportion of between about 5 and about 75 parts by weight of propylene per 100 parts of ethylene, the concentration of butylenes and higher olefines in said gaseous mixture being less than 1.0 per cent, into the benzene-metal halide reaction mixture at a temperature between about 55° C. and about 80° C.

10. The method of preparing ethyl benzene which consists in reacting a mixture consisting of ethylene and propylene with benzene in the presence of a metal halide catalyst of the Friedel-Crafts type and at a temperature above about 55° C.

11. The method of preparing ethyl benzene which consists in reacting a mixture consisting of ethylene and propylene in the proportion of between 5 and about 75 parts by weight of propylene per 100 parts of ethylene with benzene in the presence of a metal halide catalyst of the Friedel-Crafts type and at a temperature between about 55° C. and about 80° C.

JAMES L. AMOS.